United States Patent
Qian et al.

(10) Patent No.: US 8,233,809 B2
(45) Date of Patent: Jul. 31, 2012

(54) POLARIZATION INDEPENDENT FREQUENCY DOMAIN EQUALIZATION (FDE) FOR CHROMATIC DISPERSION (CD) COMPENSATION IN POLMUX COHERENT SYSTEMS

(75) Inventors: Dayou Qian, Princeton, NJ (US); Ting Wang, West Windsor, NJ (US); Kai Yang, Princeton, NJ (US); Junqiang Hu, Davis, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 244 days.

(21) Appl. No.: 12/607,125

(22) Filed: Oct. 28, 2009

(65) Prior Publication Data

US 2010/0196009 A1 Aug. 5, 2010

Related U.S. Application Data

(60) Provisional application No. 61/108,891, filed on Oct. 28, 2008, provisional application No. 61/108,892, filed on Oct. 28, 2008.

(51) Int. Cl.
*H04B 10/06* (2006.01)
(52) U.S. Cl. .......... 398/208; 398/202; 398/205
(58) Field of Classification Search .......... 398/208, 398/209
See application file for complete search history.

(56) References Cited

U.S. PATENT DOCUMENTS

| | | | | |
|---|---|---|---|---|
| 7,315,575 B2 * | 1/2008 | Sun et al. | ...... | 375/229 |
| 7,627,252 B2 * | 12/2009 | Sun et al. | ...... | 398/155 |
| 7,636,525 B1 * | 12/2009 | Bontu et al. | ...... | 398/208 |
| 7,701,842 B2 * | 4/2010 | Roberts et al. | ...... | 370/210 |
| 7,894,728 B1 * | 2/2011 | Sun et al. | ...... | 398/208 |
| 8,005,368 B2 * | 8/2011 | Roberts et al. | ...... | 398/150 |
| 2006/0285854 A1 * | 12/2006 | Sun et al. | ...... | 398/155 |
| 2007/0092260 A1 * | 4/2007 | Bontu et al. | ...... | 398/152 |
| 2009/0245816 A1 * | 10/2009 | Liu et al. | ...... | 398/208 |
| 2010/0074632 A1 * | 3/2010 | Zhou | ...... | 398/208 |
| 2010/0092181 A1 * | 4/2010 | Roberts et al. | ...... | 398/159 |
| 2010/0119241 A1 * | 5/2010 | Yang et al. | ...... | 398/208 |
| 2010/0329677 A1 * | 12/2010 | Kaneda et al. | ...... | 398/65 |
| 2011/0064421 A1 * | 3/2011 | Zhang et al. | ...... | 398/208 |
| 2011/0081150 A1 * | 4/2011 | Li et al. | ...... | 398/65 |
| 2011/0142449 A1 * | 6/2011 | Xie | ...... | 398/65 |
| 2011/0150503 A1 * | 6/2011 | Winzer | ...... | 398/202 |
| 2011/0200339 A1 * | 8/2011 | Komaki et al. | ...... | 398/208 |

* cited by examiner

*Primary Examiner* — Kenneth N Vanderpuye
*Assistant Examiner* — Amritbir Sandhu
(74) *Attorney, Agent, or Firm* — Joseph Kolodka; Jeffrey Brosemer

(57) ABSTRACT

A method for the polarization independent frequency domain equalization (FDE) chromatic dispersion compensation on polarization multiplexing (POLMUX) coherent systems. Operationally, time domain signals are converted to frequency domain signals such that time domain convolution can be done as simple multiplications in the frequency domain. These frequency domain signals then converted back to time domain for subsequent use. The input signal size and FFT size are advantageously designed so that the output signals can be continuous with some overlap between two successive frames.

1 Claim, 5 Drawing Sheets

POLARIZATION INDEPENDENT FREQUENCY DOMAIN EQUALIZATION (FDE) FOR CHROMATIC DISPERSION (CD) COMPENSATION IN POLMUX COHERENT SYSTEMS

CROSS REFERENCE TO RELATED APPLICATION

This application claims the benefit of U.S. Provisional Patent Application No. 61/108,891 filed Oct. 28, 2008 and U.S. Provisional Patent Application No. 61/108,892 filed Oct. 28, 2008 which are incorporated by reference as if set forth at length herein.

FIELD OF DISCLOSURE

This disclosure relates to the field of optical communications and in particular to method for polarization independent frequency domain equalization for chromatic dispersion compensation on polarization multiplexing (POLMUX) coherent systems.

BACKGROUND OF DISCLOSURE

With the continual increase in the speed of optical communication systems, polarization multiplexing (PolMux) systems utilizing coherent detection schemes based on digital signal processing (DSP) have been subject of much research and development. As compared with conventional systems, PolMux coherent systems utilize digital signal processing (DSP) techniques and devices to provide a number of receiver functions including—for example—chromatic dispersion (CD) compensation, polarization-mode dispersion (PMD) compensation, polarization de-multiplexing (PolDeMux), frequency offset recovery and phase noise mitigation. Of these functions, CD compensation still suffers from the absence of an efficient DSP algorithm due—in part—to its large dispersion in the time domain after a long distance transmission.

SUMMARY OF DISCLOSURE

An advance is made in the art according to an aspect of the present disclosure directed to a method for the polarization independent frequency domain equalization (FDE) chromatic dispersion compensation on polarization multiplexing (POLMUX) coherent systems. Operationally, time domain signals are converted to frequency domain signals such that time domain convolution can be done as simple multiplications in the frequency domain. These frequency domain signals then converted back to time domain for subsequent use. The input signal size and FFT size are advantageously designed so that the output signals can be continuous with some overlap between two successive frames.

Our inventive FDE method does not rely on the polarizations of the optical signals. In addition, it does not need CP or pilots. Finally, it does not need the frequency offset compensation done before either. The FFT size and the input signal frame size are designed so that the output signals from each frame can be overlapped with the previous frame to generate continuous output signals.

BRIEF DESCRIPTION OF THE DRAWING

A more complete understanding of the disclosure may be realized by reference to the accompanying drawing in which.

DESCRIPTION OF EMBODIMENTS

The following merely illustrates the principles of the various embodiments. It will thus be appreciated that those skilled in the art will be able to devise various arrangements which, although not explicitly described or shown herein, embody the principles of the embodiments and are included within their spirit and scope.

Furthermore, all examples and conditional language recited herein are principally intended expressly to be only for pedagogical purposes to aid the reader in understanding the principles of the embodiments and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures depicting the principles of the embodiments.

Figure 1:
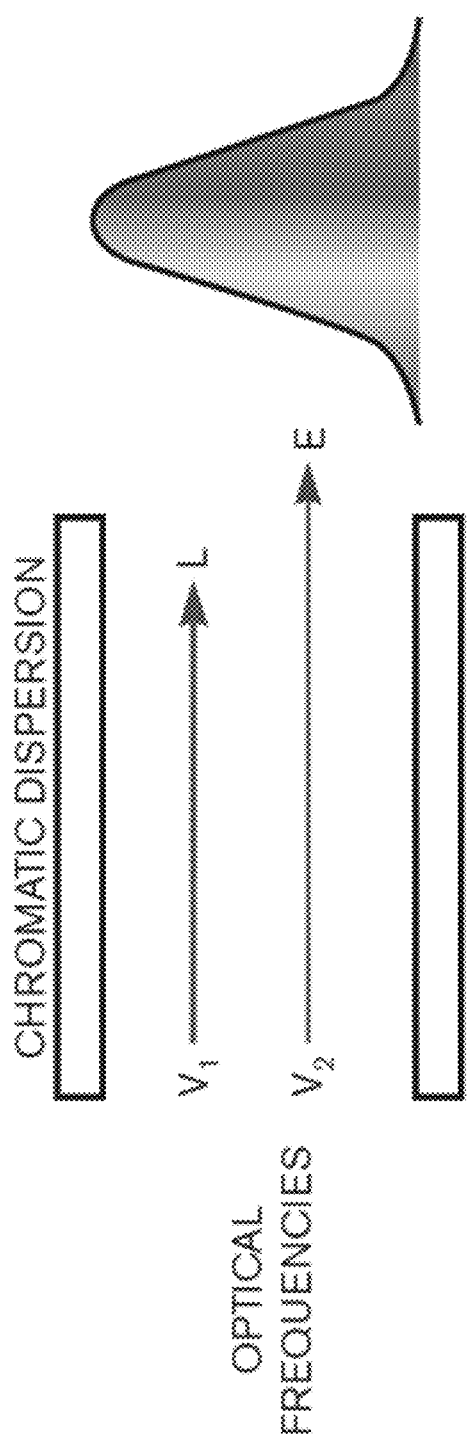
FIG. 1 is a simple graph showing pulse broadening and chromatic dispersion.

By way of some additional background, it is noted that chromatic dispersion—the result of physical and waveguide properties—manifests itself as the spreading of a pulse of light as it travels over a distance of optical fiber. As is known, optical lasers output pulses of light having a finite spectrum comprising one or more colors. Generally, the longer the fiber over which a pulse travels, the wider the pulse spreads out (See, e.g., FIG. 1).

Difficulties arise when the energy of a pulse begins to interfere with that of an adjacent pulse. This interference causes inter-symbol interference (ISI) in the electrical domain which—in turn—causes errors in transmission systems at a receiver side of a transmission link which cannot easily distinguish received symbols because they are no longer at ideal levels. Depending on the particular type of optical fiber used in a transmission system, such pulse spreading may cross several unit intervals (UIs). Generally, a dispersion of one UI means that adjacent symbols within the same symbol string begin to interfere with each other.

Single Mode Optical Fiber as used in contemporary transmission systems typically exhibits a dispersion slope of about 17 psec/nm at 1550 nm, or approximately the operating range of a long-haul transmission system. Typically, manufacturers quantify chromatic dispersion by the distance light travels along the optical fiber. A pulse having a center frequency at 1550 nm transmitting over a fiber span of 140 km would experience a total chromatic dispersion of approximately 2400 psec/nm, which is substantially equal to an anticipated long-reach standard.

As is generally known, CD compensation may be performed either optically or electrically. For optical CD compensation, dispersion compensating fiber (DCF) is added along a transmission path, generally in each fiber span. In principle, the DCF works opposite of the SSMF in terms of CD effect. However, the DCF generally adds more attenuation to the transmission path so that the optical signal to noise ratio (OSNR) at a receiving end is reduced.

For electrical CD compensation however, a number of electrical dispersion compensation (EDC) technologies are available. One important aspect of EDC is the design of an equalizer which re-shapes received electrical signals in frequency domain.

Advantageously EDC may be effectively implemented using a variety of equalization algorithms. Three common equalization algorithms are: 1) CTFs (continuous-time filters); 2) FFE/DFE (feedforward-equalizer/decision-feedback-equalizer)-algorithm combinations, and; 3) sophisticated MLSE (maximum-likelihood-sequence-estimator) equalization.

Generally, CTFs offer simple, cost-effective, and low-power EDC implementations. By boosting or band-limiting a signal within a frequency band of interest, a CTF can adjust the analog bandwidth of an optical front end, effectively acting as a low-pass filter. By amplifying certain frequencies and attenuating others through—for example wave-shaping—a CTF can compensate for chromatic dispersion. However, high-frequency noise can only be reduced by a finite amount before the before the CTF begins to filter the signal as well, thereby severely curtailing such compensation. Thus, CTFs are appropriate primarily in applications in which dispersion is not excessive.

In contrast, FFE/DFE algorithms apply a somewhat more sophisticated approach to dispersion compensation than that of a CTF. More particularly, FFE/DFE implementations use multi-tap algorithms to compensate for ISI that exceeds one UI of interference.

Generally, contemporary EDC implementations comprise an automatic gain controller (AGC) block, one or more continuous time filter/feed-forward equalizer (CTF/FFE) blocks, a decision feedback equalizer (DFE) block, a clock and data recovery (CDR) block, and a LMS (least-mean-squared) adaptation block.

When there is only a single UI of interference, compensation generally involves determining whether an adjacent symbol has spread into the current symbol and then adding or subtracting the symbol. When more than one UI of interference is present, a symbol can spread and distort several adjacent symbols, making compensation more complex. Advantageously, FFE removes distortion before a symbol's primary energy point or pre-cursor area, while DFE compensates for interference following a symbol's primary energy point or post-cursor area.

Maximum-likelihood-sequence-estimator (MLSE) implementations provide even more sophisticated equalization architectures than those already described. Since they incorporate Viterbi-decoder algorithms, an MLSE implementation requires a DSP-approach to filtering. And while MLSE can generally achieve better performance than an FFE/DFE, since they employ DSP such implementations are generally more complex and often consume two to four times the power of alternative implementations. For these reasons, MLSE-based approaches most often find use in applications requiring uncompromised performance. As an example, MLSE implementations are used to compensate for a severe nonlinearity in optical fiber, or in ultra-long-haul applications.

As may now be appreciated, one common EDC implementation uses a combination of FFE and DFE, providing a higher level of performance and reliability than do CTFs but at a more reasonable power cost than MLSE implementations require. In addition, an analog FFE/DFE design typically has lower power dissipation than a digital implementation because there is no need to convert the analog signal into the digital domain using high-speed ADC or DSPs.

An FFE implementation may advantageously employ an analog distributed amplifier using various on-chip transmission lines to create delay elements. The DFE portion uses sample data to determine signal quality and requires a bit-rate clock, so it can be implemented primarily in analog or primarily in digital, depending on the application's architecture.

One issue facing EDC is the limited CD compensation ability of such techniques—which is usually only several UI of dispersions, therefore EDC implementations cannot fully compensate the CD after long distance transmission. In most high speed transmission cases, EDC needs to jointly work with DCF to fully eliminate the CD.

More recently however, as coherent receivers and high speed ADCs have become available, CD compensation using DSP techniques and devices has become practical. Three notable DSP techniques have been proposed for designs of a digital equalizer to realize CD compensation. The three are finite impulse response (FIR) filter, infinite impulse response (IIR) filter and frequency domain equalization (FDE).

Figure 2:
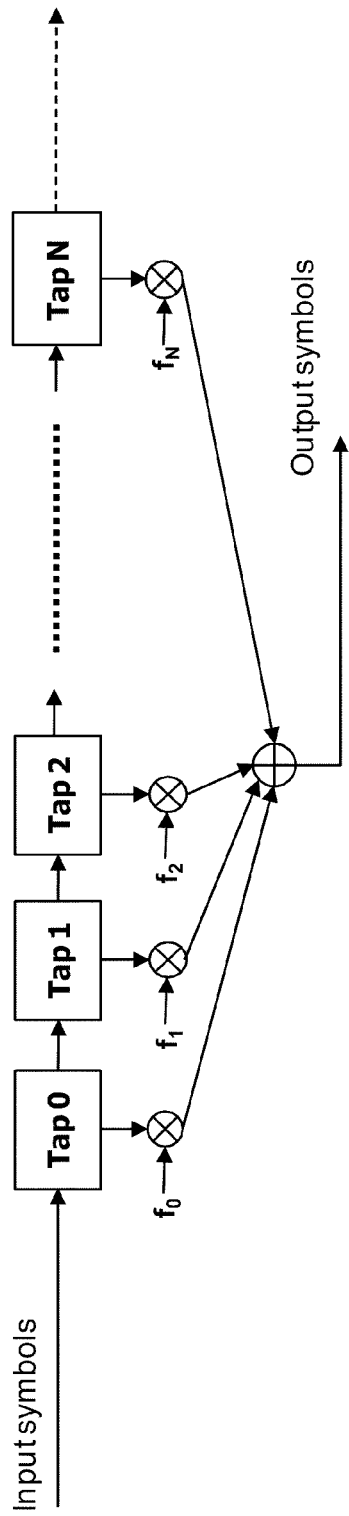
FIG. 2 is a schematic block diagram of a representative FIR filter.

FIG. 2 shows a schematic block diagram of a FIR filter. As is known by those skilled in the art, the impulse response of such a filter is "finite" because there is no feedback in the filter. As may be appreciated, such an FIR filter performs convolution of filter coefficients and an input signal. More generally, FIR filters comprise a sample delay line and a set of coefficients. An FIR filter such as that shown exhibits a number of useful properties, namely:

FIR filters are inherently stable. This is due to the fact that all the poles are located at the origin and thus are located within the unit circle.

FIR filters require no feedback. This means that any rounding errors are not compounded by summed iterations. The same relative error occurs in each calculation. This also makes implementation simpler.

FIR filters can be designed to be linear phase, which means the phase change is proportional to the frequency. This is usually desired for phase-sensitive applications, for example crossover filters, and mastering, where transparent filtering is adequate.

Of course FIR filters have disadvantages as well. One such disadvantage of FIR filters is that considerably more computation power is required to implement same. By way of an example, for effective CD compensation an FIR filter may require hundreds of taps which is simply not practical for contemporary high speed signal processing chips.

Figure 3:
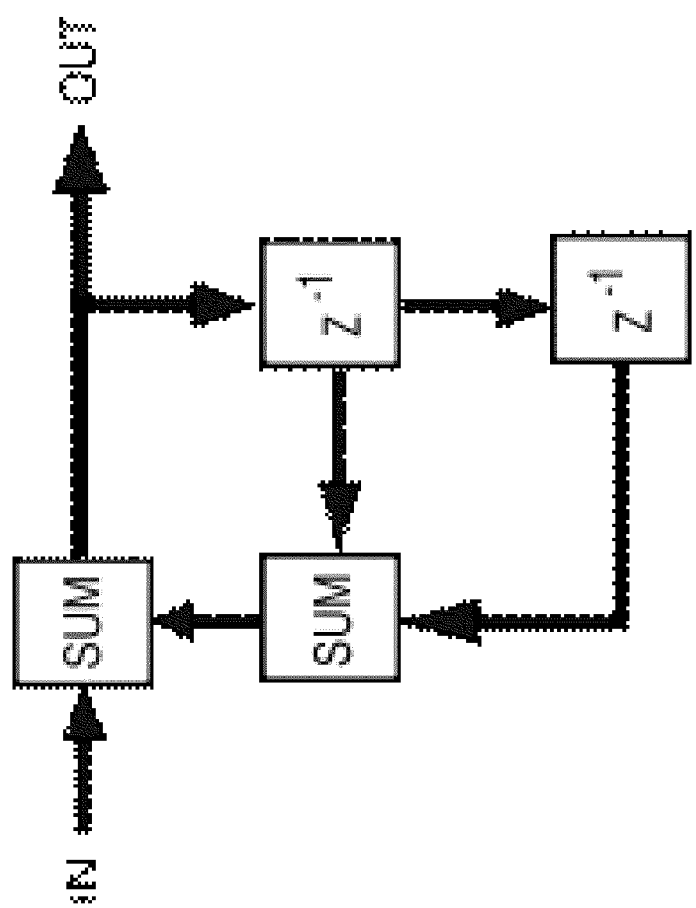
FIG. 3 is a schematic block diagram of a representative IIR filter.
Figure 4:
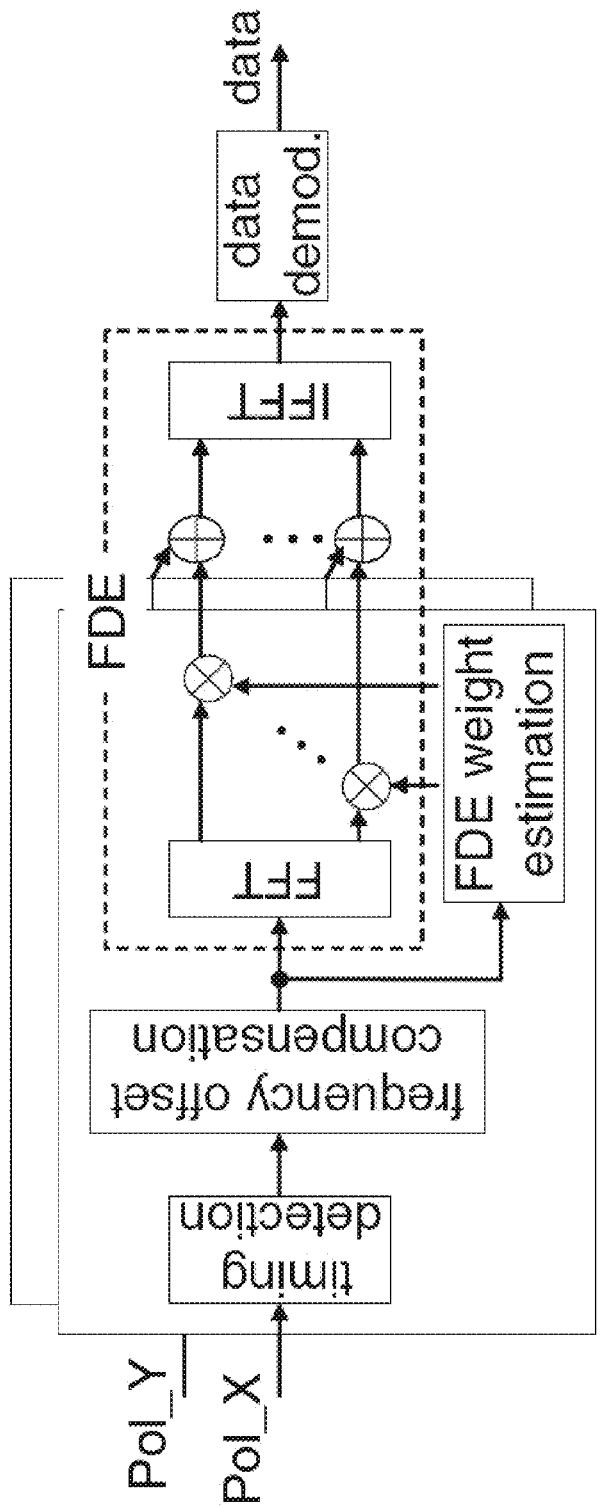
FIG. 4 is a schematic block diagram showing FDE for a single polarization transmission system with CP and pilots.

In sharp contrast, infinite impulse response (IIR) filters exhibit a response function that is non-zero over an infinite length of time. A simplified block diagram of such an IIR filter is shown in FIG. 3. The $Z^{-1}$ block is a unit of delay. The coefficients and number of feedback/feedforward paths are implementation dependent. And while an IIR filter can significantly reduce the number of taps as compared to the FIR filter by using the feedback signals, unfortunately its stability is very poor and as a result such a filter may pose a risk in production environments that require deterministic performance.

Advantageously FDE may perform CD compensation in a single polarization transmission system. The FDE method requires cyclic prefix (CP) and pilot signals inserted to the data signal at the transmitter, and time detection (frame synchronization) and frequency offset compensation before the FDE at the receiver. The FDE coefficients also need to be estimated and updated using pilot signals. As can be appreciated, the CP and pilot will increase the complexity of both transmitter and receiver because of the signal insertion and frame synchronization. The redundancy from them also reduces the transmission efficiency. In addition, because the FDE weights are estimated based on the pilots, the frequency offset compensation has to be done before the FDE. And due to the limitation of the PolDeMux methods, PolDeMux only can work if the CD has been fully compensated. Meanwhile FDE CD compensation methods require the frequency offset compensation done before the PolDeMux which would make some simple frequency offset compensation algorithm unavailable and the computing complexity much higher.

With these principles in place, we now describe our inventive FDE method to perform CD compensation for both polarizations independently in POLMUX transmission systems. Advantageously, the method may significantly reduce the computing complexity as compared with alternative methods such that it may be implemented with present-day signal processing chips. Furthermore, the CP and pilots are not required.

Operationally, continuously received signals are segmented into frames. The FFT size is designed to be larger than the length of the signal frame. The overhead helps to connect output signals from the successive frames smoothly. Our inventive FDE method does not require that time synchronization and frequency offset compensation be done before it, so that all algorithms for frequency offset compensation and PolDeMux can advantageously work with our method.

Our inventive FDE method can significantly reduce (>20×) the computing complexity such that a full CD compensation can be done by DSP only. In addition, our FDE method does not increase the computing complexity of other functions in the PolMux coherent receiver.

Figure 5:
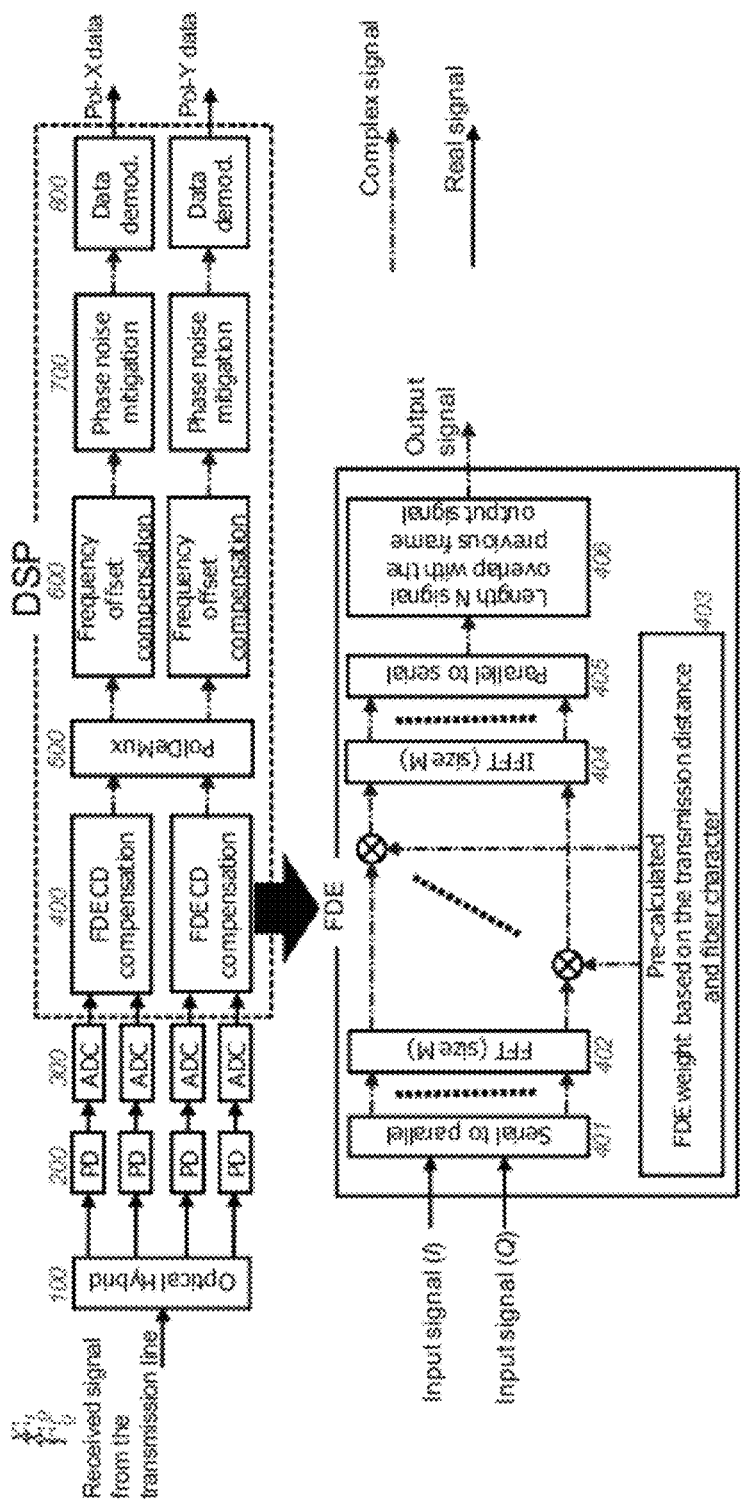
FIG. 5 is a schematic block diagram showing polarization independent FDE-based CD compensation in PolMux coherent systems.

Turning now to FIG. 5, there is shown a schematic block diagram depicting the polarization independent FDE-based CD compensation in PolMux coherent systems according to the present invention. As shown therein, a received signal is applied to an optical hybrid (100) and four output optical signals ($X'_I, X'_Q, Y'_I, Y'_Q$) are generated where X' and Y' are two random polarizations orthogonal to each other and I/Q are two orthogonal phases. These four output optical signals are detected by photo-diodes (200) and then digitized by Analog/Digital Converter (ADC 300).

I/Q signals having the same polarization are directed through FDE (400) to compensate CD. The signals having different polarizations are processed separately and independently by the FDE. Two output complex signals from the FDE (400) are jointly processed in the PolDeMux (500) to recover the signals on two original polarizations using either training signals or blind algorithms.

After the PolDeMux (500), frequency offset compensation (600), phase noise mitigation (700) and data demodulation (800) techniques are performed on the recovered signals for the two original polarizations. Advantageously our inventive FDE (400) method can be done with any function sequence as long as it is done before the PolDeMux (500). By way of specific example, an example sequence may include frequency offset compensation (600)-FDE (400)-PolDeMux (500).

Within the FDE CD compensation block (400), the input I/Q signals are converted from serial to parallel (401) firstly frame by frame. The signal frame size is M−N+1, where M is the FFT size, and N is the required tap number for the CD compensation using FIR algorithm. After serial-to-parallel conversion, the (N−1) zeros are added at the end of the signal frame (size M−N+1) to form a FFT frame matching the FFT size M. The FFT frame is transformed into frequency domain by the FFT function (402).

Equalization coefficients are pre-calculated based on the transmission distance and optical fiber characters (403). The frequency domain signals are multiplied with the corresponding coefficients and subsequently an inverse FFT (IFFT 404) and parallel-to-serial conversion (405) performed to convert the signals back into the time domain. Next the first N−1 output time domain signals from this frame are be added to the last N−1 output signals from the previous frame (406) thereby producing the final output signals. As may be appreciated, the last N−1 signals from this frame are kept until the overlap with the next frame output.

Advantageously and as can now be readily appreciated, our inventive FDE algorithm does not rely on the polarizations of the optical signals. In addition, it does not need CP or pilots. Finally, it does not need the frequency offset compensation done before either. The FFT size and the input signal frame size are designed so that the output signals from each frame can be overlapped with the previous frame to generate continuous output signals.

As may be further appreciated and according to an aspect of the present disclosure, the time domain signals are converted to frequency domain signals so that the time domain convolution can be done as simple multiplications in frequency domain. Then the frequency domain signals are converted back to time domain. The input signal size and FFT size have are designed so that the output signals can be continuous with some overlap between two successive frames.

At this point, while we have discussed and described the invention using some specific examples, those skilled in the art will recognize that our teachings are not so limited. Accordingly, the invention should be only limited by the scope of the claims attached hereto.

The invention claimed is:
1. A method for polarization independent, frequency domain equalization-based chromatic dispersion compensation of a polarization multiplexed (PolMux) optical signal comprising:
  applying the PolMux optical signal to an optical hybrid such that four output signals $X'_I, X'_Q, Y'_I, Y'_Q$ are produced wherein X' and Y' represent two random polarizations orthogonal to one another and I and Q represent two orthogonal phases;
  generating four digital electrical signals from the four output signals;
  applying the four digital electrical signals to a digital signal processor wherein the followings are performed:
  performing a frequency domain equalization-based chromatic dispersion compensation of the four digital electrical signals thereby producing two complex signals;
  polarization demultiplexing the two complex signals; and
  demodulating X and Y data from the two complex signals such that two signals Pol-X data and Pol-Y data are produced,
  wherein said frequency domain equalization-based chromatic dispersion compensation includes:
    converting the digital signals to parallel digital signals in a frame-by-frame manner;

forming a fast fourier transform (FFT) frame of size M from the converted frame;
transforming the FFT frame into a frequency domain;
multiplying the frequency domain frame with corresponding coefficients;
performing an inverse FFT to transform the frame into the time domain; and
adding the first N−1 output time domain signals from this frame with the last N−1 output time domain signals from the previous frame such that final output signals are produced.

\* \* \* \* \*